(12) United States Patent
Ma et al.

(10) Patent No.: US 11,403,789 B2
(45) Date of Patent: Aug. 2, 2022

(54) METHOD AND ELECTRONIC DEVICE FOR PROCESSING IMAGES

(71) Applicant: BEIJING DAJIA INTERNET INFORMATION TECHNOLOGY CO., LTD., Beijing (CN)

(72) Inventors: Chongyang Ma, Beijing (CN); Zhenyang Liu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/172,873

(22) Filed: Feb. 10, 2021

(65) Prior Publication Data

US 2021/0407154 A1 Dec. 30, 2021

(30) Foreign Application Priority Data

Jun. 30, 2020 (CN) .......................... 202010617757.0

(51) Int. Cl.
| | | |
|---|---|---|
| *G06T 11/00* | (2006.01) | |
| *G06T 7/73* | (2017.01) | |
| *G06T 7/90* | (2017.01) | |
| *G06T 5/00* | (2006.01) | |
| *G06T 5/50* | (2006.01) | |
| *G06T 5/40* | (2006.01) | |
| *G06T 7/40* | (2017.01) | |
| *G06T 11/20* | (2006.01) | |

(52) U.S. Cl.
CPC ............ *G06T 11/001* (2013.01); *G06T 5/002* (2013.01); *G06T 5/50* (2013.01); *G06T 7/40* (2013.01); *G06T 7/73* (2017.01); *G06T 7/90* (2017.01); *G06T 11/203* (2013.01); *G06T 2210/21* (2013.01)

(58) Field of Classification Search
CPC combination set(s) only.
See application file for complete search history.

(56) References Cited

U.S. PATENT DOCUMENTS

| | | | |
|---|---|---|---|
| 8,249,365 B1 * | 8/2012 | Winnemoeller | G06F 3/0484 382/219 |
| 2013/0021460 A1 * | 1/2013 | Burdoucci | A45D 44/005 348/77 |
| 2021/0133934 A1 * | 5/2021 | Kaneko | G06T 5/008 |

* cited by examiner

*Primary Examiner* — Wesner Sajous
(74) *Attorney, Agent, or Firm* — Kolitch Romano LLP (57) ABSTRACT

A method for processing images includes recognizing a hair region in a target image; acquiring a hairline direction of each pixel point in the hair region; acquiring an intermediate image by smoothing the hair region based on the hairline direction; and acquiring a virtual hairline along the hairline direction, and acquiring a first image by superimposing the virtual hairline to the hair region in the intermediate image.

20 Claims, 5 Drawing Sheets

METHOD AND ELECTRONIC DEVICE FOR PROCESSING IMAGES

The present application claims priority to Chinese Patent Application No. 202010617757.0, filed on Jun. 30, 2020, which is incorporated herein by reference in its entirety.

TECHNICAL FIELD

The present disclosure relates to the field of image processing technologies, and in particular, relates to a method for processing images, an electronic device, and a storage medium.

BACKGROUND

The processing and enhancement of portrait photos have always been an important application in the field of computer vision and artificial intelligence. In recent years, a series of progresses have been made in automatic beautification algorithms for digital images of human figures, but the automatic beautification algorithms mainly focus on two major aspects of facial features and body posture, such as beautifying, whitening, acne removal, and body slimming.

With the increase of users' demands and development of technologies, methods for beautifying hair of portraits have gradually emerged. A typical hairdressing and image editing algorithm is an algorithm related to a "hair softening" function. The core of the algorithm is to smooth a hair region in the portrait based on a hairline direction, so as to achieve the effects of filtering mix-color and making the hair look softer and smoother.

SUMMARY

Embodiments of the present disclosure provide a method for processing images, an electronic device, and a storage medium.

In an aspect, a method for processing images is provided. The method includes: recognizing a hair region in a target image; acquiring a hairline direction of each pixel point in the hair region, wherein the hairline direction indicates a texture orientation of each pixel point in the hair region; acquiring an intermediate image by smoothing the hair region based on the hairline direction; acquiring a virtual hairline along the hairline direction; and acquiring a first image by superimposing the virtual hairline to the hair region in the intermediate image.

In another aspect, an electronic device is provided. The electronic device includes: a processor; and a memory configured to store at least one computer program including at least one instruction executable by the processor;

wherein the at least one instruction, when loaded and executed by the processor, causes the processor to perform a method including: recognizing a hair region in a target image; acquiring a hairline direction of each pixel point in the hair region, wherein the hairline direction indicates a texture orientation of each pixel point in the hair region; acquiring an intermediate image by smoothing the hair region based on the hairline direction; acquiring a virtual hairline along the hairline direction; and acquiring a first image by superimposing the virtual hairline to the hair region in the intermediate image.

In another aspect, a storage medium is provided. The storage medium stores at least one computer program including at least one instruction. The at least one instruction, when loaded and executed by a processor of an electronic device, causes the electronic device to perform a method including: recognizing a hair region in a target image; acquiring a hairline direction of each pixel point in the hair region, wherein the hairline direction indicates a texture orientation of each pixel point in the hair region; acquiring an intermediate image by smoothing the hair region based on the hairline direction; acquiring a virtual hairline along the hairline direction; and acquiring a first image by superimposing the virtual hairline to the hair region in the intermediate image.

In another aspect, a computer program product including at least one instruction is provided. The at least one instruction, when loaded and executed by a processor of an electronic device, causes the electronic device to perform the method for processing images.

It should be understood that both the foregoing general description and the following detailed description are exemplary and explanatory only and are not intended to limit the present disclosure.

DETAILED DESCRIPTION

In order to make a person of ordinary skill in the art better understand the technical solutions of the present disclosure, the technical solutions in the embodiments of the present disclosure are clearly and completely described in the following with reference to the accompanying drawings.

It should be noted that the terms "first," "second" and the like in the description and claims, as well as the above accompanying drawings, of the present disclosure are used to distinguish similar objects, but not necessarily used to describe a specific order or precedence order. It should be understood that data used in this way can be interchanged where appropriate, such that the embodiments of the present disclosure described herein can be practiced in a sequence other than those illustrated or described herein. The embodiments set forth in the following description of various embodiments do not represent all embodiments consistent with the present disclosure. Instead, they are merely examples of apparatuses and methods consistent with some aspects of the present disclosure as recited in the appended claims.

The terms "smoothing" and "transition-smoothing," as used herein, are broad terms and are used in their ordinary sense, without limitation, to refer to modification of a set of image data (a hair region in a target image) to make it smoother and more continuous or to remove or diminish noise points, for example, by performing a moving average of the raw images.

In the technical solutions according to the present disclosure, the effects of filtering mix-color and making the hair look softer and smoother are achieved, and hairlines are further clearly presented, thereby beautifying the hair and retouching the image.

Figure 1:
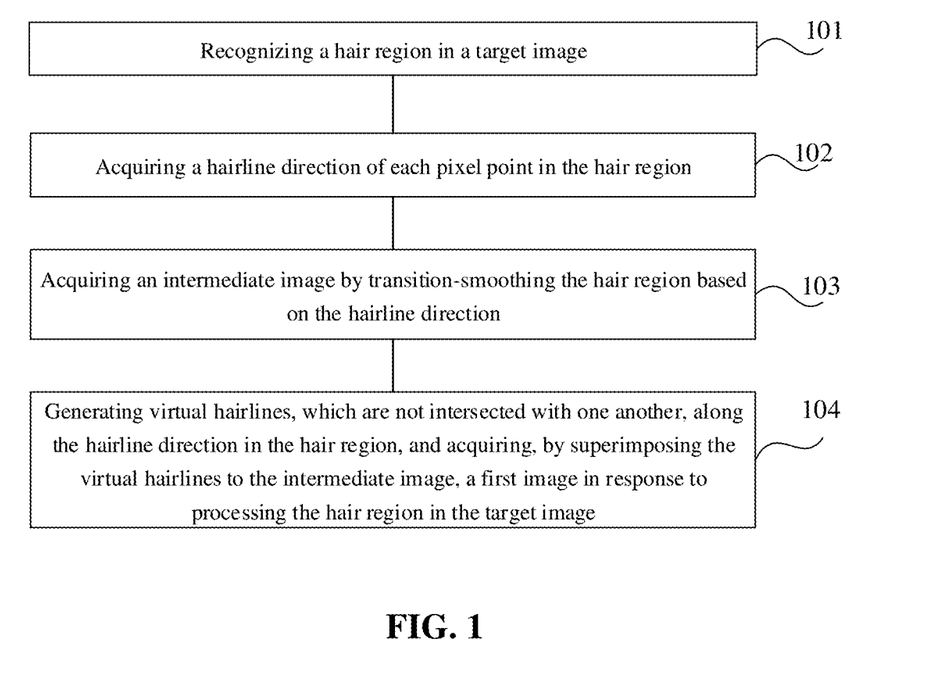
FIG. 1 is a flowchart illustrating a method for processing images according to one embodiment.

FIG. 1 is a flowchart illustrating a method for processing images according to one embodiment of the present disclosure. As shown in FIG. 1, the method may include the following contents.

In 101, an electronic device recognizes a hair region in a target image.

The target image is an image including the hair region. This image may be an image locally stored in the electronic device or an image downloaded from a network side by the electronic device; and may also be any frame image in a video locally stored in the electronic device or any frame image in a video downloaded from the network side by the electronic device.

In addition, the hair region may be recognized by using any method based on deep learning or neural network. For example, the hair region in the target image is recognized based on a semantic segmentation model. Alternatively, the hair region may be recognized by using a non-deep learning method or marked by a user manually. It should be noted that the method for recognizing the hair region is not limited to the methods described herein and may also be practiced in any other ways.

In 102, the electronic device acquires a hairline direction of each pixel point in the hair region.

The hairline direction indicates a texture orientation of each pixel point in the hair region. Since the texture in the hair region is also hairline in the hair region, the texture orientation is also the hairline direction.

In some embodiments, the electronic device may calculate a gradient of each pixel point in the hair region by using a predetermined gradient operator and then calculate the hairline direction of each pixel point based on the gradient of each pixel point.

In some embodiments, the electronic device may design filters in the direction of 180 discrete values from 0 to 179 degrees in advance, then perform convolution on a neighborhood pattern of each pixel point in the hair region in the target image and the filters along different directions, so as to find the maximum value of convolution results (that is, find the maximum filtering response), and finally determine the hairline direction of the pixel point based on the direction corresponding to the maximum value. The neighborhood pattern of a pixel point refers to a square frame with the pixel point as the center, which may contain 7×7 or 9×9 pixel points.

In some embodiments, the electronic device may mark the hairline direction in the hair region in a large number of sample images by manual operations in advance; and use the data as input to perform training by using machine learning and deep neural network methods, so as to generate a model capable of predicting the hairline direction; and further input the above target image into the model. Thus, the hairline direction of each pixel point in the hair region in the target image may be output.

It should be noted that acquiring the hairline direction is not limited to the above three ways and may also be practiced in any other ways in addition to the above three ways.

In 103, the electronic device acquires an intermediate image by transition-smoothing the hair region based on the hairline direction.

The smoothing and the transition-smoothing refers to modification the hair region to make it smoother and more continuous or to remove or diminish noise points.

103 is a practice for the electronic device to acquire the intermediate image by smoothing the hair region based on the hairline direction.

In 104, the electronic device generates virtual hairlines, which are not intersected with one another, along the hairline direction in the hair region, and acquires, by superimposing the virtual hairlines to the intermediate image, an image in response to processing the hair region in the target image.

Figure 3:
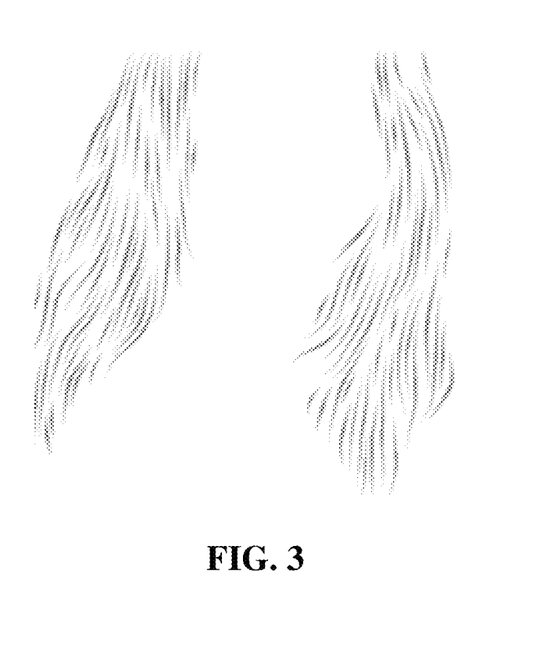
FIG. 3 is a schematic diagram of a virtual hairline in one embodiment.

The virtual hairlines are hairlines added to the hair region in the target image in addition to hairlines in the target image, and are configured to supplement hairline details in the hair region in the target image. In some embodiments, such as in the method for processing images according to the embodiment of the present disclosure, the generated virtual hairlines may be as shown in FIG. 3.

104 is a practice for the electronic device to acquire the virtual hairline along the hairline direction, and acquire the first image by superimposing the virtual hairline to the hair region in the intermediate image.

In some embodiments, the process of acquiring the first image includes: generating a plurality of specular maps spaced apart from each other at first preset distances, in a direction perpendicular to the hairline direction in the hair region; acquiring, by superimposing these specular maps to the intermediate image, a second image in response to processing the hair region in the target image; and acquiring the first image by superimposing the virtual hairline to the hair region in the second image.

Each two specular maps are spaced apart from each other at a preset distance which is set in advance. It should be noted here that the preset distance may also be modified according to user demands. For example, an increase button and a decrease button may be set in a setting interface of hairdressing and image editing, the current value of the preset distance increases in response to detecting a click operation on the increase button, and the current value of the preset distance decreases in response to detecting a click operation on the decrease button.

The above process is a practice for the electronic device to acquire the specular map, acquire the second image by superimposing the specular map to the hair region in the intermediate image, and acquire the first image by superimposing the virtual hairline to the hair region in the second image. A texture orientation of pixel points in the specular map is perpendicular to the hairline direction of pixel points at a corresponding position in the target image.

In some embodiments, when the specular map is superimposed to the intermediate image, the electronic device may acquire a color value of a pixel point at a corresponding position in the second image by adding a color value of the pixel point in the specular map and a color value of a pixel point at a corresponding position in the intermediate image.

In some embodiments, when the virtual hairline is superimposed to the second image, the electronic device may acquire a color value of a pixel point at a corresponding position in the first image by adding a color value of the pixel point in the virtual hairline and the color value of the pixel point at the corresponding position in the second image.

In some embodiments, in response to acquiring the specular map, the electronic device may generate a virtual specular hairline along the hairline direction in the hair region, wherein a brightness of the virtual specular hairline is greater than or equal to a preset brightness; and acquire the specular map by Gaussian blurring the virtual specular hairline, wherein a direction of Gaussian blurring is perpendicular to the hairline direction.

In some embodiments, adjacent specular maps are spaced apart from each other at first preset distances in response to a plurality of specular maps being present; or adjacent specular maps may be spaced apart from each other at different preset distances.

Figure 4:
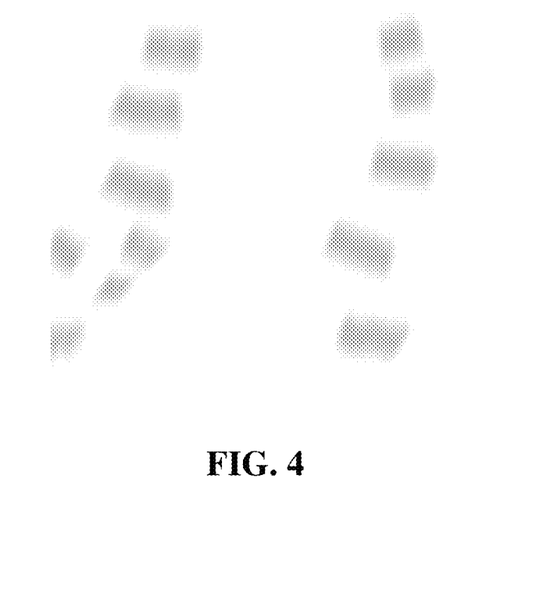
FIG. 4 is a schematic diagram of a specular map in one embodiment.

In some embodiments, the generated specular maps may be as shown in FIG. 4. It should be noted that the specular virtual hairlines may be rendered as a white line in a black background image, such that the specular map may be acquired by Gaussian blurring this image. Therefore, the specular map may be white, and the background where the specular map is located is black. FIG. 4 is merely a schematic diagram of the specular map and does not represent that the specular map is black and the background therein is white in the embodiment.

In some embodiments, after acquiring, by superimposing the virtual hairline to the intermediate image, the first image in response to processing the hair region in the target image, the method further includes: generating a plurality of specular maps spaced apart from each other at first preset distances in a direction perpendicular to the hairline direction in the hair region; and superimposing the specular maps to the first image. The process of acquiring the specular map is similar to the above situation and is not repeated herein.

In some embodiments, when the specular map is superimposed to the first image, the electronic device may acquire a color value of a pixel point at a corresponding position in the first image upon superimposition by adding a color value of the pixel point in the specular map and a color value of a pixel point at a corresponding position in the first image.

In some embodiments, the method further includes the following steps before the virtual hairlines, which are not intersected with one another, are generated along the hairline direction in the hair region.

A plurality of specular maps spaced apart from each other at first preset distances are generated in a direction perpendicular to the hairline direction in the hair region; and a second image in response to processing the hair region in the target image is acquired by superimposing the specular maps to the intermediate image.

Superimposing the virtual hairline to the intermediate image includes: superimposing the virtual hairline to the second image.

The above second image is an image to which the virtual hairline is superimposed.

It can be seen from the above that the process of generating the virtual hairline and the process of the generating the specular map may be performed in parallel and the virtual hairline and the specular map are superimposed to the intermediate image respectively to acquire the first image (i.e., the first image to which the virtual hairline is superimposed) and the second image (i.e., the second image to which the specular map is superimposed) respectively; or firstly the virtual hairline is generated and the first image is acquired by superimposing the virtual hairline to the intermediate image, and then the specular map is generated and the specular map is superimposed to the first image; or firstly the specular map is generated and the second image is acquired by superimposing the specular map to the intermediate image, and then the virtual hairline is generated and the virtual hairline is superimposed to the second image.

In addition, it should be noted that the process of generating the virtual hairline may be independent of the process of the generating the specular map. That is, only the virtual hairline may be generated and thus only the virtual hairline is superimposed to the intermediate image; or only the specular map may be generated and thus only the specular map is superimposed to the intermediate image.

Figure 2:
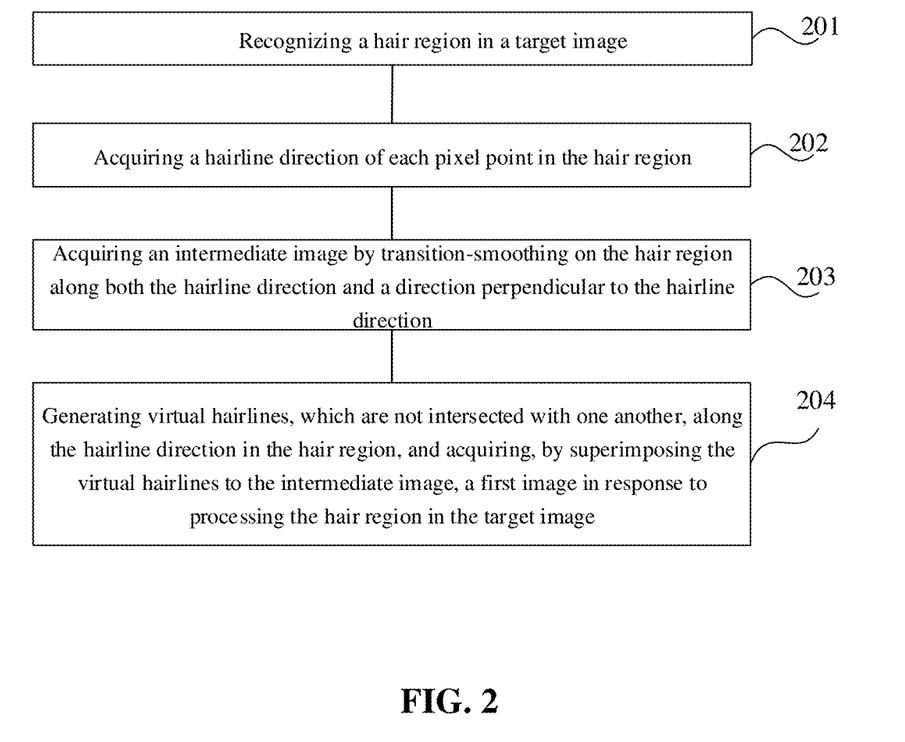
FIG. 2 is a flowchart illustrating another method for processing images according to one embodiment.

FIG. 2 is a flowchart illustrating another method for processing images according to one embodiment of the present disclosure. As shown in FIG. 2, the method may include the following contents.

In 201, an electronic device recognizes a hair region in a target image.

The target image is an image including the hair region. This image may be an image locally stored in the electronic device or an image downloaded from a network side by the electronic device; and may also be any frame image in a video locally stored in the electronic device or any frame image in a video downloaded from the network side by the electronic device.

In addition, the hair region may be recognized by using any method based on deep learning or neural network. For example, the hair region in the target image is recognized based on a semantic segmentation model. Alternatively, the hair region may be recognized by using a non-deep learning method or marked by a user manually. It should be noted that the method for recognizing the hair region is not limited to the methods described herein and may also be practiced in any other ways.

In 202, the electronic device acquires a hairline direction of each pixel point in the hair region.

The hairline direction indicates a texture orientation of each pixel point in the hair region. Since the texture in the hair region is also hairline in the hair region, the texture orientation is also the hairline direction.

In some embodiments, the electronic device may calculate a gradient of each pixel point in the hair region by using a predetermined gradient operator and then calculate the hairline direction of each pixel point based on the gradient of each pixel point.

In some embodiments, the electronic device may design filters in the direction of 180 discrete values from 0 to 179 degrees in advance, then perform convolution on a neighborhood pattern of each pixel point in the hair region in the target image and the filters along different directions, so as to find the maximum value of convolution results (that is, find the maximum filtering response), and finally determine the hairline direction of the pixel point based on the direction corresponding to the maximum value. The neighborhood pattern of a pixel point refers to a square frame with the pixel point as the center, which may contain 7×7 or 9×9 pixel points.

In some embodiments, the electronic device may mark the hairline direction in the hair region in a large number of sample images by manual operations in advance; and use the data as input to perform training by using machine learning and deep neural network methods, so as to generate a model capable of predicting the hairline direction; and further input the above target image into the model. Thus, the hairline direction of each pixel point in the hair region in the target image may be output.

It should be noted that the manner to acquire the hairline direction is not limited to the above three manners and may also be any other manner in addition to the above three ways.

In 203, the electronic device acquires an intermediate image by transition-smoothing the hair region along both the hairline direction and a direction perpendicular to the hairline direction.

The smoothing and the transition-smoothing refers to modification the hair region to make it smoother and more continuous or to remove or diminish noise points.

In addition, the hairline direction and the direction perpendicular to the hairline direction each include a component of a first preset direction and a component of a second preset direction, and the first preset direction is perpendicular to the second preset direction. In some embodiments, the first preset direction is, for example, a positive direction of the x axis of a coordinate system in the target image, and the second preset direction is a positive direction of the y axis of the coordinate system. The x component and the y component of the hairline direction may be displayed in the image by using different color channels. For example, two color channels, i.e., a red channel and a green channel, may be used to correspond to magnitudes of the x component and the y component of the hairline direction respectively.

203 is a practice for the electronic device to acquire the intermediate image by smoothing the hair region along the hairline direction and the direction perpendicular to the hairline direction respectively.

It can be seen therefrom that in the method for processing images according to the embodiment of the present disclosure, the hair region is transition-smoothed along two directions, i.e., the hairline direction and the direction perpendicular to the hairline direction, namely, "two-dimensional" smoothing. That is, "two-dimensional" smoothing is adopted in the process of acquiring the intermediate image by smoothing the hair region based on the hairline direction.

In 204, the electronic device generates virtual hairlines, which are not intersected with one another, along the hairline direction in the hair region; and acquires, by superimposing the virtual hairlines to the intermediate image, a first image in response to processing the hair region in the target image.

The virtual hairlines are hairlines added to the hair region in the target image in addition to hairlines in the target image, and are configured to supplement hairline details in the hair region in the target image. In some embodiments, such as in the method for processing images according to the embodiment of the present disclosure, the generated virtual hairlines may be as shown in FIG. 3.

204 is a possible practice for the electronic device to acquire the virtual hairline along the hairline direction; and acquire the first image by superimposing the virtual hairline to the hair region in the intermediate image.

In some embodiments, generating the virtual hairlines, which are not intersected with one another, along the hairline direction in the hair region includes: randomly generating a plurality of sampling points in the hair region according to preset spacing; and acquiring the virtual hairlines, which are not intersected with one another, by extension from the sampling point along the hairline direction before a boundary of the hair region is reached or it is a second preset distance from the generated virtual hairline.

In some embodiments, in response to acquiring the virtual hairline along the hairline direction, the electronic device may perform the following operations: randomly generating a plurality of sampling points in the hair region; and determining the virtual hairline by extension from the sampling points in the hairline direction.

In some embodiments, in response to determining the virtual hairline by taking the sampling point as the starting point, the electronic device may perform the following operations: determining an extension line, wherein the extension line starts at the sampling point and extends in the hairline direction; determining a first intersection in response to the extension line being intersected with any virtual hairline, wherein the first intersection is an intersection between the extension line and any virtual hairline; determining a target point in the extension line, wherein the target point is spaced at a second preset distance from the first intersection and is on the side of the extension line near the sampling point; and determining a line segment between the sampling point and the target point as the virtual hairline.

In some embodiments, in response to determining the virtual hairline by extension from the sampling points in the hairline direction, the electronic device may perform the following operations: determining an extension line, wherein the extension line starts at the sampling point and extends in the hairline direction; determining a second intersection in response to the extension line being not intersected with any existing virtual hairline, wherein the second intersection is an intersection between the extension line and the boundary of the hair region; and determining a line segment between the sampling point and the second intersection as the virtual hairline.

In some embodiments, when the virtual hairline is generated, firstly it needs to randomly generate a plurality of sampling points (such as sampling points a1-a50), which are spaced apart from each other by preset spacing, in the hair region; and then each of these sampling points, respectively, as the starting point, is extended along the hairline direction to generate virtual hairlines. During each extension process, the extension is stopped when it encounters the boundary of the hair region or is too proximal to the generated virtual hairlines.

As the above sampling points are generated randomly, for the same image, positions of the generated sampling points may still be different when the method for processing images according to the embodiment of the present disclosure is adopted for processing, and thus virtual hairlines acquired by performing extension from the sampling points are different.

In some embodiments, superimposing the virtual hairline to the intermediate image includes: superimposing the virtual hairline to the intermediate image by rendering.

That is, the virtual hairline is superimposed to the hair region in the intermediate image while rendering the intermediate image.

In some embodiments, the electronic device generates a plurality of specular maps spaced apart from each other at first preset distances, in a direction perpendicular to the hairline direction in the hair region; acquires, by superimposing these specular maps to the intermediate image, a second image in response to processing the hair region in the target image; and acquires the first image by superimposing the virtual hairline to the hair region in the second image.

Each two specular maps are spaced apart from each other at a preset distance which is set in advance. It should be noted here that the preset distance may also be modified according to user demands. For example, an increase button and a decrease button may be set in a setting interface of hairdressing and image editing, the current value of the preset distance increases in response to detecting a click operation on the increase button, and the current value of the preset distance decreases in response to detecting a click operation on the decrease button.

The above process is a practice for the electronic device to acquire the specular map, acquire the second image by superimposing the specular map to the hair region in the intermediate image, and acquire the first image by superimposing the virtual hairline to the hair region in the second image. A texture orientation of pixel points in the specular map is perpendicular to the hairline direction of pixel points at a corresponding position in the target image.

In some embodiments, when the specular map is superimposed to the intermediate image, the electronic device may acquire a color value of a pixel point at a corresponding position in the second image by adding a color value of the pixel point in the specular map and a color value of a pixel point at a corresponding position in the intermediate image.

In some embodiments, when the virtual hairline is superimposed to the second image, the electronic device may acquire a color value of a pixel point at a corresponding position in the first image by adding a color value of the pixel point in the virtual hairline and the color value of the pixel point at the corresponding position in the second image.

In some embodiments, when acquiring the specular map, the electronic device may generate a virtual specular hairline along the hairline direction in the hair region, wherein a brightness of the virtual specular hairline is greater than or equal to a preset brightness; and acquire the specular map by Gaussian blurring the virtual specular hairline, wherein a direction of Gaussian blurring is perpendicular to the hairline direction.

In some embodiments, adjacent specular maps are spaced apart from each other at first preset distances in response to a plurality of specular maps being present; or adjacent specular maps may be spaced apart from each other at different preset distances.

In some embodiments, such as in the method for processing images according to the embodiment of the present disclosure, the generated specular maps may be as shown in FIG. 4.

In some embodiments, after acquiring, by superimposing the virtual hairline to the intermediate image, the first image in response to processing the hair region in the target image, the method further includes: generating a plurality of specular maps spaced apart from each other at first preset distances in a direction perpendicular to the hairline direction in the hair region; and superimposing the specular maps to the first image. The process of acquiring the specular map is similar to the above situation and is not repeated herein.

In some embodiments, when the specular map is superimposed to the first image, the electronic device may acquire a color value of a pixel point at a corresponding position in the first image upon superimposition by adding a color value of the pixel point in the specular map and a color value of a pixel point at a corresponding position in the first image.

In some embodiments, before generating the virtual hairlines, which are not intersected with one another, along the hairline direction in the hair region, the method further includes: generating plurality of specular maps spaced apart from each other at first preset distances in a direction perpendicular to the hairline direction in the hair region; and acquiring, by superimposing the specular maps to the intermediate image, a second image in response to processing the hair region in the target image.

Superimposing the virtual hairline to the intermediate image includes: superimposing the virtual hairline to the second image.

The above second image is an image to which the virtual hairline is superimposed.

It can be seen from the above that the process of generating the virtual hairline and the process of the generating the specular map may be performed in parallel and the virtual hairline and the specular map are superimposed to the intermediate image respectively to acquire the first image (i.e., the intermediate image to which the virtual hairline is superimposed) and the second image (i.e., the intermediate image to which the specular map is superimposed) respectively; or firstly the virtual hairline is generated and the first image is acquired by superimposing the virtual hairline to the intermediate image, and then the specular map is generated and the specular map is superimposed to the first image; or firstly the specular map is generated and the second image is acquired by superimposing the specular map to the intermediate image, and then the virtual hairline is generated and the first image is acquired by superimposing the virtual hairline to the second image.

In addition, it should be noted that the process of generating the virtual hairline is independent of the process of the generating the specular map. That is, only the virtual hairline may be generated and thus only the virtual hairline is superimposed to the intermediate image; or only the specular map may be generated and thus only the specular map is superimposed to the intermediate image.

In some embodiments, generating the plurality of specular maps spaced apart from each other at first preset distances in the direction perpendicular to the hairline direction in the hair region includes: generating virtual specular hairlines, which are not intersected with one another and have a brightness greater than or equal to a preset brightness, along the hairline direction in the hair region; and acquiring specular maps by Gaussian blurring the virtual specular hairlines in the direction perpendicular to the hairline direction by taking the first preset distance as spacing.

As the virtual specular hairlines are generated in the hair region, it needs to extract the virtual specular hairlines from the hair region when the virtual specular hairlines are Gaussian blurred. It is possible to "render the virtual specular hairlines on a background image of a first color as lines of a second color," such that the virtual specular hairlines are extracted from the hair region. Further, the lines of the second color may be Gaussian blurred in the direction perpendicular to the hairline direction by taking the first preset distance as spacing, thereby acquiring the specular maps.

In addition, the first color above may be black and the second color above may be white.

It can be seen therefrom that it needs to perform processing based on the virtual hairline when the specular map is generated. Therefore, when the specular map is generated, firstly it needs to generate the virtual specular hairlines which are not intersected with one another and have the brightness greater than or equal to the preset brightness along the hairline direction in the hair region; then, the virtual specular hairlines on the background image of the first color are rendered as the lines of the second color, such that the virtual specular hairlines are extracted from the hair region; and finally the lines are Gaussian blurred in the directions perpendicular to the hairline directions of the pixel points of the lines by taking the first preset distance as spacing. Thus, a plurality of specular maps may be acquired. For the generation method of the virtual hairline, on which generation of the specular maps is based, reference may be made to the generation method of the virtual hairline in 204, which is not repeated herein.

But it should be noted that for the process of generating the virtual hairline in 204 above and the process of generating the virtual hairline in the process of generating the specular maps, there are slight differences in parameters. In some embodiments, compared to the virtual hairlines generated in 204, the virtual hairlines generated in the process of generating the specular maps have greater spacing and the hairlines are wider and shorter.

In addition, as the above sampling points are generated randomly, the virtual hairlines generated based on the sampling points have randomness and thus the specular maps acquired based on the virtual hairlines also have randomness. Therefore, even for the same image, positions of the generated sampling points may still be different when the method for processing images according to the embodiment of the present disclosure is adopted for processing. As a result, the virtual hairlines acquired by performing extension from the sampling points are different and the specular maps acquired based on the virtual hairlines are also different.

In some embodiments, superimposing the specular map to the intermediate image includes: adding a color value of the pixel point in the specular map and a color value of a target pixel point in the intermediate image, wherein the sum is to be taken as a color value of the adjusted target pixel point; wherein the target pixel point is such a pixel point in the intermediate image that corresponds to a position of a pixel point in the specular map.

In some embodiments, the intermediate image to which the specular map is superimposed may be acquired by adding the color value of each pixel point of the specular map and the color value of each pixel point of the intermediate image.

Figure 5:
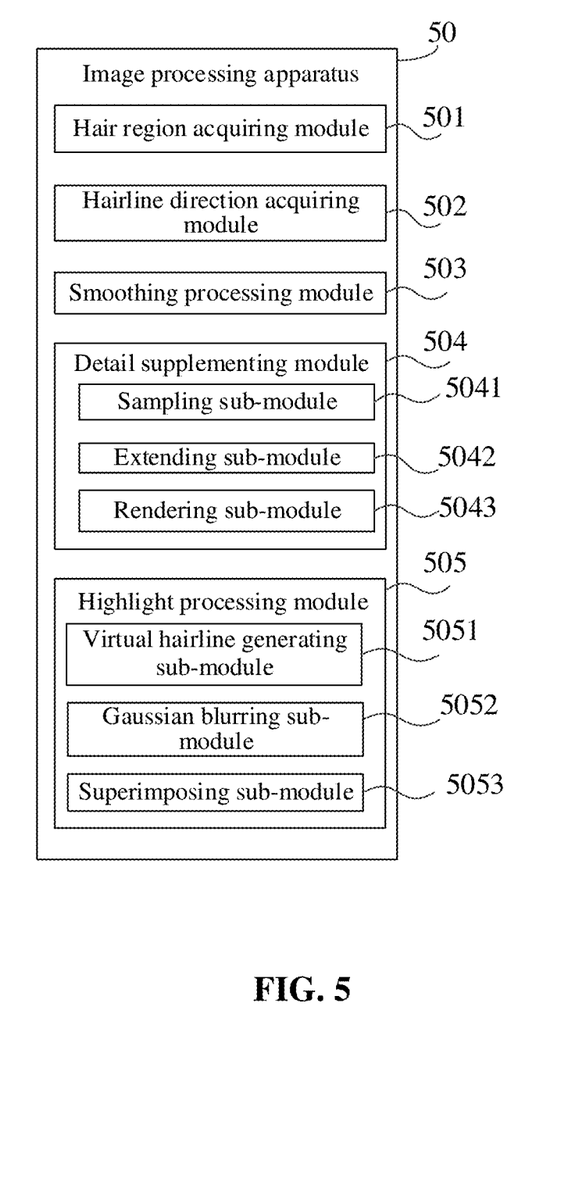
FIG. 5 is a block diagram illustrating an apparatus for processing images according to one embodiment.

FIG. 5 is a block diagram illustrating an apparatus for processing images according to one embodiment of the present disclosure.

As shown in FIG. 5, an apparatus 50 for processing images includes: a hair region acquiring module 501, configured to recognize a hair region in a target image; a hairline direction acquiring module 502, configured to acquire a hairline direction of each pixel point in the hair region, wherein the hairline direction indicates a texture orientation of each pixel point in the hair region; a smoothing processing module 503, configured to acquire the intermediate image by smoothing the hair region based on the hairline direction; and a detail supplementing module 504, configured to generate virtual hairlines, which are not intersected with one another, along the hairline direction in the hair region, and acquire, by superimposing the virtual hairlines to the intermediate image, a first image in response to processing the hair region in the target image.

In some embodiments, the detail supplementing module 504 is configured to acquire a virtual hairline along the hairline direction, and acquire a first image by superimposing the virtual hairline to the hair region in the intermediate image.

In some embodiments, the apparatus further includes: a specularity processing module 505, configured to: after the smoothing processing module 503 acquires the intermediate image by transition-smoothing the hair region based on the hairline direction, generate a plurality of specular maps spaced apart from each other at first preset distances, in a direction perpendicular to the hairline direction in the hair region, and acquire, by superimposing these specular maps to the intermediate image, a second image in response to processing the hair region in the target image.

In some embodiments, the specularity processing module 505 is configured to acquire the specular map, wherein a texture orientation of pixel points in the specular map is perpendicular to the hairline direction of pixel points at a corresponding position in the target image; acquire a second image by superimposing the specular map to a hair region in the intermediate image; and acquire the first image by superimposing the virtual hairline to the hair region in the second image.

In some embodiments, the specularity processing module 505 is configured to acquire a color value of a pixel point at a corresponding position in the second image by adding a color value of the pixel point in the specular map and a color value of a pixel point at a corresponding position in the intermediate image.

In some embodiments, the specularity processing module 505 is configured to: generate a virtual specular hairline along the hairline direction in the hair region, wherein a brightness of the virtual specular hairline is greater than or equal to a preset brightness; and acquire the specular map by Gaussian blurring the virtual specular hairline, wherein a direction of Gaussian blurring is perpendicular to the hairline direction.

In some embodiments, adjacent specular maps are spaced apart from each other at a first preset distance in response to a plurality of specular maps being present.

In some embodiments, the apparatus further includes: a specularity processing module 505, configured to: after the detail supplementing module 504 acquires, by superimposing the virtual hairlines to the intermediate image, the first image in response to processing the hair region in the target image, generate a plurality of specular maps spaced apart from each other at first preset distances, in a direction perpendicular to the hairline direction in the hair region, and superimpose these specular maps to the first image.

In some embodiments, the apparatus further includes: a specularity processing module 505, configured to: before the detail supplementing module 504 generates virtual hairlines, which are not intersected with one another, along the hairline direction in the hair region, generate a plurality of specular maps spaced apart from each other at first preset distances, in a direction perpendicular to the hairline direction in the hair region, and acquire, by superimposing these specular maps to the intermediate image, a second image in response to processing the hair region in the target image.

When superimposing the virtual hairline to the intermediate image, the detail supplementing module 504 is configured to: superimpose the virtual hairline to the second image.

In some embodiments, the detail supplementing module 504 includes: a sampling sub-module 5041, configured to randomly generate a plurality of sampling points in the hair region; and an extending sub-module 5042, configured to acquire virtual hairlines, which are not intersected with one another, by extension from the sampling point along the hairline direction before a boundary of the hair region is reached or it is a second preset distance from the generated virtual hairline.

In some embodiments, the extending sub-module 5042 is configured to determine the virtual hairline which extends along the hairline direction by taking the sampling point as a starting point.

In some embodiments, the extending sub-module 5042 is configured to: determine an extension line, wherein the extension line starts at the sampling point and extends in the hairline direction; and determine a line segment between the sampling point and a target point on the extension line as the virtual hairline in response to the extension line being intersected with any virtual hairline, wherein the target point is spaced at a second preset distance from a first intersection and is on a side of the extension line proximal to the sampling point, and the first intersection is an intersection between the extension line and the any virtual hairline.

In some embodiments, the extending sub-module 5042 is configured to: determine an extension line, wherein the extension line starts at the sampling point and extends in the hairline direction; determine a second intersection in response to the extension line being not intersected with any existing virtual hairline, wherein the second intersection is an intersection between the extension line and a boundary of the hair region; and determine a line segment between the sampling point and the second intersection as the virtual hairline.

In some embodiments, the detail supplementing module 504 further includes: a rendering sub-module 5043, configured to superimpose the virtual hairline to the intermediate image by rendering.

In some embodiments, the rendering sub-module 5043 is configured to superimpose the virtual hairline to the hair region in the intermediate image while rendering the intermediate image.

In some embodiments, the specularity processing module 505 includes: a virtual hairline generating sub-module 5051, configured to generate virtual specular hairlines which are not intersected with one another and have a brightness greater than or equal to a preset brightness along the hairline direction in the hair region; and a Gaussian blurring sub-module 5052, configured to acquire the specular maps by Gaussian blurring the virtual specular hairlines in the direction perpendicular to the hairline direction by taking the first preset distance as spacing.

In some embodiments, the specularity processing module 505 includes: a superimposing sub-module 5053, configured to add a color value of the pixel point in the specular map and a color value of a target pixel point in the intermediate image, wherein the sum is to be taken as a color value of the adjusted target pixel point; wherein the target pixel point is such a pixel point in the intermediate image that corresponds to a position of a pixel point in the specular map.

In some embodiments, the smoothing processing module 503 is configured to: acquire an intermediate image by transition-smoothing the hair region along both the hairline direction and a direction perpendicular to the hairline direction.

That is, the smoothing processing module 503 is configured to acquire the intermediate image by smoothing the hair region along the hairline direction and the direction perpendicular to the hairline direction respectively.

With regard to the apparatus in the aforesaid embodiments, the specific manner in which the respective modules perform the operations has been described in detail in embodiments of the methods, and will not be explained in detail herein.

Figure 6:
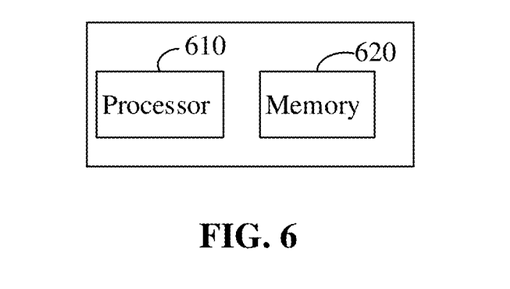
FIG. 6 is a block diagram illustrating an electronic device according to one embodiment.

FIG. 6 is a block diagram illustrating an electronic device according to one embodiment of the present disclosure. Referring to FIG. 6, the electronic device includes: a processor 610; and a memory 620 configured to store at least one computer program including at least one instruction.

The at least one computer program, when loaded and run by the processor 610, causes the processor 610 to execute instructions for: recognizing a hair region in a target image; acquiring a hairline direction of each pixel point in the hair region, wherein the hairline direction indicates a texture orientation of each pixel point in the hair region; acquiring an intermediate image by smoothing the hair region based on the hairline direction; acquiring a virtual hairline along the hairline direction; and acquiring a first image by superimposing the virtual hairline to the hair region in the intermediate image.

In some embodiments, the at least one computer program, when loaded and run by the processor 610, causes the processor 610 to execute instructions for: acquiring a specular map, wherein a texture orientation of pixel points in the specular map is perpendicular to the hairline direction of pixel points at a corresponding position in the target image; acquiring a second image by superimposing the specular map to the hair region in the intermediate image; and acquiring the first image by superimposing the virtual hairline to the hair region in the second image.

In some embodiments, the at least one computer program, when loaded and run by the processor 610, causes the processor 610 to execute an instruction for: acquiring a first color value of a first pixel point in the specular map and a second color value of a second pixel point in the intermediate image, wherein the second pixel point corresponds to the first pixel point; and determining a third color value of a third pixel point in the second image by adding the first color value and the second color value, wherein the third pixel point corresponds to the first pixel point and the second pixel point.

In some embodiments, the at least one computer program, when loaded and run by the processor 610, causes the processor 610 to execute instructions for: generating a virtual specular hairline along the hairline direction in the hair region, wherein a brightness of the virtual special hairline is greater than or equal to a preset brightness; and acquiring the specular map by Gaussian blurring the virtual specular hairline, wherein a direction of Gaussian blurring is perpendicular to the hairline direction.

In some embodiments, adjacent specular maps are spaced apart from each other at first preset distances in response to a plurality of specular maps being present.

In some embodiments, the at least one computer program, when loaded and run by the processor 610, causes the processor 610 to execute instructions for: randomly generating a plurality of sampling points in the hair region; and determining the virtual hairline by extension from the sampling points in the hairline direction.

In some embodiments, the at least one computer program, when loaded and run by the processor 610, causes the processor 610 to execute instructions for: determining an extension line, wherein the extension line starts at the sampling point and extends in the hairline direction; determining a first intersection in response to the extension line being intersected with any virtual hairline, wherein the first intersection is an intersection between the extension line and any virtual hairline; determining a target point in the extension line, wherein the target point is spaced at a second preset distance from the first intersection and is on the side of the extension line near the sampling point; and determining a line segment between the sampling point and the target point as the virtual hairline.

In some embodiments, the at least one computer program, when loaded and run by the processor 610, causes the processor 610 to execute instructions for: determining an extension line, wherein the extension line starts at the sampling point and extends in the hairline direction; determining a second intersection in response to the extension line being not intersected with any existing virtual hairline, wherein the second intersection is an intersection between the extension line and a boundary of the hair region; and determining a line segment between the sampling point and the second intersection as the virtual hairline.

In some embodiments, the at least one computer program, when loaded and run by the processor 610, causes the processor 610 to execute an instruction for: superimposing the virtual hairline to the hair region in the intermediate image while rendering the intermediate image.

In some embodiments, the at least one computer program, when loaded and run by the processor 610, causes the processor 610 to execute an instruction for: acquiring the intermediate image by smoothing the hair region along the hairline direction and a direction perpendicular to the hairline direction, respectively.

Figure 7:
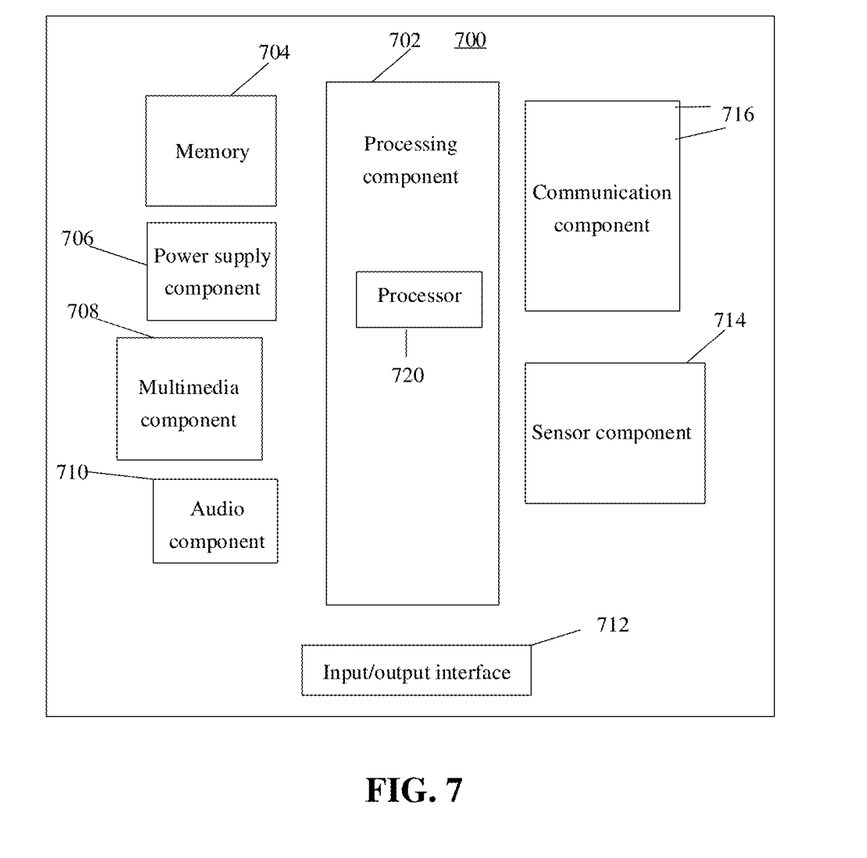
FIG. 7 is a block diagram illustrating another electronic device according to one embodiment.

FIG. 7 is a block diagram illustrating another electronic device 700 according to one embodiment of the present disclosure. For example, the electronic device 700 may be a mobile phone, a computer, a digital broadcast terminal, a message transceiving device, a game console, a tablet device, a medical device, a fitness device, a personal digital assistant or the like.

Referring to FIG. 7, the electronic device 700 may include one or more of following components: a processing component 702, a memory 704, a power supply component 706, a multimedia component 708, an audio component 710, an input/output (I/O) interface 712, a sensor component 714, and a communication component 716.

The processing component 702 usually controls the overall operations of the electronic device 700, such as operations associated with display, telephone call, data communication, camera, and recording. The processing component 702 may include one or more processors 720 to execute instructions, so as to complete all or part of the steps of the above method. In addition, the processing component 702 may include one or more modules to facilitate interaction between the processing component 702 and other components. For example, the processing component 702 may include a multimedia module to facilitate interaction between the multimedia component 708 and the processing component 702.

The memory 704 is configured to store various types of data to support operations at the electronic device 700. The examples of the data include an instruction of any application or method operated on the electronic device 700, contact person data, telephone book data, a message, a photo, a video and the like. The memory 704 may be implemented by any type of a volatile storage device or a non-volatile storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power supply component 706 provides power for various components of the electronic device 700. The power supply component 706 may include a power supply management system, one or more power supplies, and other components associated with generation, management and distribution of power for the electronic device 700.

The multimedia component 708 includes a screen that provides an output interface and is located between the electronic device 700 and a user. In some embodiments, the screen may include a liquid crystal display (LCD) and a touch panel (TP). If the screen includes the touch panel, the screen may be implemented as a touch screen, so as to receive an input signal from the user. The touch panel includes one or more touch sensors to sense touch, sliding and a gesture on the touch panel. The touch sensor may not only sense a boundary of a touch or sliding action, but also detect a duration and pressure related to the touch or swipe operation. In some embodiments, the multimedia component 708 includes a front camera and/or a rear camera. When the electronic device 700 is in an operation mode, such as a shooting mode or a video mode, the front camera and/or the rear camera may receive external multimedia data. Each of the front camera and the rear camera may be a fixed optical lens system or has a focal length and an optical zooming capability.

The audio component 710 is configured to output and/or input an audio signal. For example, the audio component 710 includes a microphone (MIC). The microphone is configured to receive an external audio signal when the electronic device 700 is in the operation mode, such as a call mode, a recording mode, and a speech recognition mode. The received audio signal may be further stored in the memory 704, or sent via the communication component 716. In some embodiments, the audio component 710 further includes a speaker for outputting the audio signal.

The I/O interface 712 is an interface provided between the processing component 702 and a peripheral interface module which may be a keyboard, a click wheel, a button or the like. These buttons include, but are not limited to: a homepage button, a volume button, a starting button, and a locking button.

The sensor component 714 includes one or more sensors for providing the electronic device 700 with state assessment of various aspects. For example, the sensor component 714 may detect an on/off state of the electronic device 700, and relative positioning of the assemblies, such as the display and a small keypad of the electronic device 700. The sensor component 714 may also detect a position change of the electronic device 700 or one component of the electronic device 700, whether the user contacts the electronic device 700 or not, an orientation or acceleration/deceleration of the electronic device 700 and a temperature change of the electronic device 700. The sensor component 714 may include a proximity sensor configured to detect the presence of nearby objects without any physical contact. The sensor component 714 may further include an optical sensor, such as a CMOS or CCD image sensor used in an imaging application. In some embodiments, the sensor component 714 may further include an acceleration sensor, a gyro sensor, a magnetic sensor, a pressure sensor, or a temperature sensor.

The communication component 716 is configured to facilitate wired or wireless communication between the electronic device 700 and other devices. The electronic device 700 may access a wireless network based on a communication standard, such as wireless fidelity (Wi-Fi), and operator networks (such as 2G, 3G, 4G, or 5G), or a combination thereof. In some embodiments, the communication component 716 receives a broadcast signal or broadcast-related information from an external broadcast management system via a broadcast channel. In some embodiments, the communication component 716 further includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In some embodiments, the electronic device 700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, which are configured to perform the method for processing images above.

In some embodiments, a non-transitory computer-readable storage medium including an instruction is further provided, such as a memory 704 including an instruction.

The above instruction may be executed by the processor 720 of the electronic device 700 to complete the method for processing images above. In some embodiments, for example, the storage medium may be a non-transitory computer-readable storage medium. For example, the non-transitory computer-readable storage medium may be a ROM, a random-access memory (RAM), a CD-ROM, a magnetic tape, a floppy disk, an optical data storage device or the like.

In some embodiments, a storage medium is further provided. The storage medium stores at least one computer program including at least one instruction.

The at least one computer program, when loaded and run by a processor of an electronic device, causes the electronic device to execute instructions for: recognizing a hair region in a target image; acquiring a hairline direction of each pixel point in the hair region, wherein the hairline direction indicates a texture orientation of each pixel point in the hair region; acquiring an intermediate image by smoothing the hair region based on the hairline direction; acquiring a virtual hairline along the hairline direction; and acquiring a first image by superimposing the virtual hairline to the hair region in the intermediate image.

In some embodiments, the at least one computer program, when loaded and run by the processor of the electronic device, causes the electronic device to execute instructions for: acquiring a specular map, wherein a texture orientation of pixel points in the specular map is perpendicular to the hairline direction of pixel points at a corresponding position in the target image; acquiring a second image by superimposing the specular map to the hair region in the intermediate image; and acquiring the first image by superimposing the virtual hairline to the hair region in the second image.

In some embodiments, the at least one computer program, when loaded and run by the processor of the electronic device, causes the electronic device to execute an instruction for: acquiring a first color value of a first pixel point in the specular map and a second color value of a second pixel point in the intermediate image, wherein the second pixel point corresponds to the first pixel point; and determining a third color value of a third pixel point in the second image by adding the first color value and the second color value, wherein the third pixel point corresponds to the first pixel point and the second pixel point.

In some embodiments, the at least one computer program, when loaded and run by the processor of the electronic device, causes the electronic device to execute instructions for: generating a virtual specular along the hairline direction in the hair region, wherein a brightness of the virtual specular hairline is greater than or equal to a preset brightness; and acquiring the specular map by Gaussian blurring the virtual specular hairline, wherein a direction of Gaussian blurring is perpendicular to the hairline direction.

In some embodiments, adjacent specular maps are spaced apart from each other at first preset distances in response to a plurality of specular maps being present.

In some embodiments, the at least one computer program, when loaded and run by the processor of the electronic device, causes the electronic device to execute instructions for: randomly generating a plurality of sampling points in the hair region; and determining the virtual hairline by extension from the sampling points in the hairline direction.

In some embodiments, the at least one computer program, when loaded and run by the processor of the electronic device, causes the electronic device to execute instructions for: determining an extension line, wherein the extension line starts at the sampling point and extends in the hairline direction; determining a first intersection in response to the extension line being intersected with any virtual hairline, wherein the first intersection is an intersection between the extension line and any virtual hairline; determining a target point in the extension line, wherein the target point is spaced at a second preset distance from the first intersection and is on the side of the extension line near the sampling point; and determining a line segment between the sampling point and the target point as the virtual hairline.

In some embodiments, the at least one computer program, when loaded and run by the processor of the electronic device, causes the electronic device to execute instructions for: determining an extension line, wherein the extension line starts at the sampling point and extends in the hairline direction; determining a second intersection in response to the extension line being not intersected with any existing virtual hairline, wherein the second intersection is an intersection between the extension line and a boundary of the hair region; and determining a line segment between the sampling point and the second intersection as the virtual hairline.

In some embodiments, the at least one computer program, when loaded and run by the processor of the electronic device, causes the electronic device to execute an instruction for: superimposing the virtual hairline to the hair region in the intermediate image while rendering the intermediate image.

In some embodiments, the at least one computer program, when loaded and run by the processor of the electronic device, causes the electronic device to execute an instruction for: acquiring the intermediate image by smoothing the hair region along the hairline direction and a direction perpendicular to the hairline direction respectively.

According to another aspect of embodiments of the present disclosure, a computer program product including at least one instruction is provided. The at least one instruction, when loaded and executed by a processor of an electronic device, causes the electronic device to perform the method for processing images.

Other embodiments of the present disclosure will be apparent to those skilled in the art from consideration of the description and practice of the present disclosure. The present disclosure is intended to cover any variations, uses, or adaptations of the present disclosure following general principles of the present disclosure and including the common general knowledge or conventional technical means in the art which is not disclosed in the present disclosure. The description and embodiments are to be considered as exemplary only, with a true scope and spirit of the present disclosure being indicated by the following claims.

It should be understood that the present disclosure is not limited to the exact structures described above and illustrated in the accompanying drawings, and that various modifications and changes may be made without departing from the scope thereof. It is intended that the scope of the present disclosure should only be subject to the appended claims.

What is claimed is:

1. A method for processing an image, applied to an electronic device, comprising:
    recognizing a hair region in a target image, wherein the target image is an image locally stored in the electronic device or downloaded from a network side by the electronic device;
    acquiring a hairline direction of each pixel point in the hair region, wherein the hairline direction indicates a texture orientation of each pixel point in the hair region;

generating an intermediate image by smoothing the hair region based on the hairline direction;
generating a virtual hairline along the hairline direction; and
generating a first image by superimposing the virtual hairline to the hair region in the intermediate image to obtain the processed image.

2. The method according to claim 1, wherein generating the first image by superimposing the virtual hairline to the hair region in the intermediate image comprises:
generating a specular map, wherein a texture orientation of pixel points in the specular map is perpendicular to the hairline direction of pixel points at a corresponding position in the target image;
generating a second image by superimposing the specular map to the hair region in the intermediate image; and
generating the first image by superimposing the virtual hairline to the hair region in the second image.

3. The method according to claim 2, wherein superimposing the specular map to the hair region in the intermediate image comprises:
acquiring a first color value of a first pixel point in the specular map and a second color value of a second pixel point in the intermediate image, wherein the second pixel point corresponds to the first pixel point; and
determining a third color value of a third pixel point in the second image by adding the first color value and the second color value, wherein the third pixel point corresponds to the first pixel point and the second pixel point.

4. The method according to claim 2, wherein generating the specular map comprises:
generating a virtual specular hairline along the hairline direction in the hair region, wherein a brightness of the virtual specular hairline is greater than or equal to a preset brightness; and
generating the specular map by Gaussian blurring the virtual specular hairline, wherein a direction of Gaussian blurring is perpendicular to the hairline direction.

5. The method according to claim 2, wherein adjacent specular maps are spaced apart from each other at first preset distances in response to a plurality of specular maps being present.

6. The method according to claim 1, wherein generating the virtual hairline along the hairline direction comprises:
randomly generating a plurality of sampling points in the hair region; and
determining the virtual hairline by extension from the sampling points in the hairline direction.

7. The method according to claim 6, wherein determining the virtual hairline by extension from the sampling points in the hairline direction comprises:
determining an extension line, wherein the extension line starts at the sampling point and extends in the hairline direction;
determining a first intersection in response to the extension line being intersected with any virtual hairline, wherein the first intersection is an intersection between the extension line and any virtual hairline;
determining a target point in the extension line, wherein the target point is spaced at a second preset distance from the first intersection and is on a side of the extension line near the sampling point; and
determining a line segment between the sampling point and the target point as the virtual hairline.

8. The method according to claim 6, wherein determining the virtual hairline by extension from the sampling points in the hairline direction comprises:
determining an extension line, wherein the extension line starts at the sampling point and extends in the hairline direction;
determining a second intersection in response to the extension line being not intersected with any existing virtual hairline, wherein the second intersection is an intersection between the extension line and a boundary of the hair region; and
determining a line segment between the sampling point and the second intersection as the virtual hairline.

9. The method according to claim 1, wherein superimposing the virtual hairline to the hair region in the intermediate image comprises:
superimposing the virtual hairline to the hair region in the intermediate image while rendering the intermediate image.

10. The method according to claim 1, wherein generating the intermediate image by smoothing the hair region based on the hairline direction comprises:
generating the intermediate image by smoothing the hair region along the hairline direction and a direction perpendicular to the hairline direction respectively.

11. An electronic device, comprising:
a processor; and
a memory configured to store at least one computer program comprising at least one instruction executable by the processor;
wherein the at least one instruction, when loaded and executed by the processor, causes the processor to perform a method comprising:
recognizing a hair region in a target image, wherein the target image is an image locally stored in the electronic device or downloaded from a network side by the electronic device;
acquiring a hairline direction of each pixel point in the hair region, wherein the hairline direction indicates a texture orientation of each pixel point in the hair region;
generating an intermediate image by smoothing the hair region based on the hairline direction;
generating a virtual hairline along the hairline direction; and
generating a first image by superimposing the virtual hairline to the hair region in the intermediate image to obtain a processed image.

12. The electronic device according to claim 11, wherein generating the first image by superimposing the virtual hairline to the hair region in the intermediate image comprises:
generating a specular map, wherein a texture orientation of pixel points in the specular map is perpendicular to the hairline direction of pixel points at a corresponding position in the target image;
generating a second image by superimposing the specular map to the hair region in the intermediate image; and
generating the first image by superimposing the virtual hairline to the hair region in the second image.

13. The electronic device according to claim 12, wherein superimposing the specular map to the hair region in the intermediate image comprises:
acquiring a first color value of a first pixel point in the specular map and a second color value of a second pixel point in the intermediate image, wherein the second pixel point corresponds to the first pixel point; and determining a third color value of a third pixel point in the second image by adding the first color value and the second color value, wherein the third pixel point corresponds to the first pixel point and the second pixel point.

14. The electronic device according to claim 12, wherein generating the specular map comprises:
    generating a virtual specular hairline along the hairline direction in the hair region, wherein a brightness of the virtual specular hairline is greater than or equal to a preset brightness; and
    generating the specular map by Gaussian blurring the virtual specular hairline, wherein a direction of Gaussian blurring is perpendicular to the hairline direction.

15. The electronic device according to claim 12, wherein adjacent specular maps are spaced apart from each other at a first preset distance in response to a plurality of specular maps being present.

16. The electronic device according to claim 11, wherein generating the virtual hairline along the hairline direction comprises:
    randomly generating a plurality of sampling points in the hair region; and
    determining the virtual hairline by extension from the sampling points in the hairline direction.

17. The electronic device according to claim 16, wherein determining the virtual hairline by extension from the sampling points in the hairline direction comprises:
    determining an extension line, wherein the extension line starts at the sampling point and extends in the hairline direction; and
    determining a first intersection in response to the extension line being intersected with any virtual hairline, wherein the first intersection is an intersection between the extension line and any virtual hairline;
    determining a target point in the extension line, wherein the target point is spaced at a second preset distance from the first intersection and is on a side of the extension line near the sampling point;
    determining a line segment between the sampling point and the target point as the virtual hairline.

18. The electronic device according to claim 16, wherein determining the virtual hairline by extension from the sampling points in the hairline direction comprises:
    determining an extension line, wherein the extension line starts from the sampling point and extends in the hairline direction;
    determining a second intersection in response to the extension line being not intersected with any existing virtual hairline, wherein the second intersection is an intersection between the extension line and a boundary of the hair region; and
    determining a line segment between the sampling point and the second intersection as the virtual hairline.

19. The electronic device according to claim 11, wherein superimposing the virtual hairline to the hair region in the intermediate image comprises:
    superimposing the virtual hairline to the hair region in the intermediate image while rendering the intermediate image.

20. A storage medium storing at least one computer program comprising at least one instruction; wherein the at least one instruction, when loaded and executed by a processor of an electronic device, causes the electronic device to perform a method comprising:
    recognizing a hair region in a target image, wherein the target image is an image locally stored in the electronic device or downloaded from a network side by the electronic device;
    acquiring a hairline direction of each pixel point in the hair region, wherein the hairline direction indicates a texture orientation of each pixel point in the hair region;
    generating an intermediate image by smoothing the hair region based on the hairline direction;
    generating a virtual hairline along the hairline direction; and
    generating a first image by superimposing the virtual hairline to the hair region in the intermediate image to obtain a processed image.

* * * * *